July 19, 1927.

J. W. FAY

SOLDERING UNIT

Filed Aug. 9, 1924

1,636,175

Inventor
Joseph W. Fay
by
*Att'y.*

Patented July 19, 1927.

1,636,175

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

SOLDERING UNIT.

Application filed August 9, 1924. Serial No. 731,179.

This invention relates to soldering units, and more particularly to soldering units comprising solder and fluxing material.

The object of the invention is to provide soldering units composed of solder and fluxing material in a readily dispensable form.

In one form of the invention, a substantially spherical shell of solder encloses a core of resin and has a smooth outer surface, the amount of resin in the core being properly proportioned with respect to the amount of solder in the shell to provide a unit suitable for one soldering operation.

Figure 1:
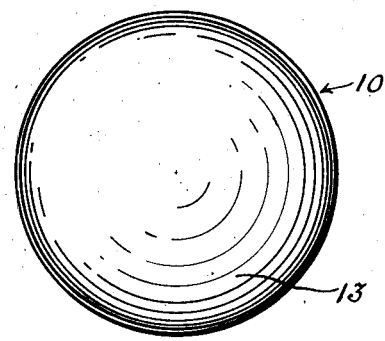
Figure 2:
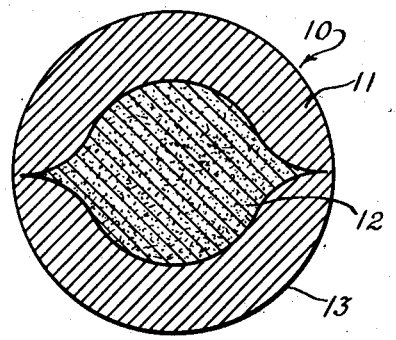

Other objects and features of the invention will become apparent as the detailed description progresses, reference being had to the accompanying drawing, wherein Fig. 1 is an elevation of a soldering unit embodying the invention, and Fig. 2 is a central section through the improved soldering unit.

Referring to the drawing, the reference character 10 designates in general a soldering unit comprising a shell 11 of solder enclosing a core 12 of resin which is employed as a fluxing agent.

The shell 11 has a smooth spherical exterior surface 13 which imparts a pellet form to the soldering unit, and is particularly advantageous in that it permits the soldering unit to be readily dispensed by comparatively simple apparatus, such as shown in my copending applications. The core 12 consists of a sufficient amount of resin to properly flux the surface or surfaces to which the solder in the shell 11 may be applied. In the preferred form of the invention the core 12 is entirely enclosed within the shell 11 so that the fluxing material will not escape therefrom. This insures that a plurality of soldering units of equal size and substantially identical composition may be employed in a series of similar soldering operations to produce an article in which each soldered connection is substantially identical with the others, the surfaces of each connection being properly fluxed and the connections being made with an equal amount of solder.

To insure that a plurality of soldering units will be of equal size and of substantially identical composition, they are preferably produced by the method and apparatus described in my copending application, Serial No. 736,844, filed September 10, 1924. The improved method is preferably practiced by apparatus adapted to sever predetermined lengths from flux cored solder and to form the predetermined lengths into pellets of solder having cores of fluxing material. The apparatus is adapted to form a smooth exterior surface upon each pellet.

What is claimed is:

A spherical soldering pellet comprising a substantially spherical core of fluxing material, and a spherical shell of solder completely sealing the core of fluxing material therein and presenting a smooth outer surface.

In witness whereof, I hereunto subscribe my name this 31st day of July, A. D., 1924.

JOSEPH WILLIAM FAY.